March 26, 1968     J. M. PHILLIPS ET AL     3,374,907
DUMP BUCKET

Filed July 5, 1966     3 Sheets-Sheet 1

INVENTORS
JAMES M. PHILLIPS
ALFRED D. PARKE, Jr.
BY
Christy, Parmelee & Strickland
their ATTORNEYS March 26, 1968 J. M. PHILLIPS ET AL 3,374,907
DUMP BUCKET Filed July 5, 1966 3 Sheets-Sheet 2

INVENTORS
JAMES M. PHILLIPS
ALFRED D. PARKE, Jr.
BY Christy, Parmelee
 & Strickland
their ATTORNEYS March 26, 1968 J. M. PHILLIPS ET AL 3,374,907
DUMP BUCKET Filed July 5, 1966 3 Sheets-Sheet 3

INVENTORS
JAMES M. PHILLIPS
ALFRED D. PARKE, Jr.
BY
Christy, Pamelee & Strickland
their ATTORNEYS United States Patent Office 3,374,907
Patented Mar. 26, 1968

3,374,907
DUMP BUCKET
James M. Phillips, Bridgeville, and Alfred D. Parke, Jr., Pittsburgh, Pa., assignors to Phillips Mine & Mill Supply Co., Carnegie, Pa., a corporation of Pennsylvania
Filed July 5, 1966, Ser. No. 565,646
7 Claims. (Cl. 214—41)

ABSTRACT OF THE DISCLOSURE

This application discloses a so-called automatic dump bucket wherein the bucket and lifting bail for the bucket are so interconnected that when the bail is suspended from a crane hook the bucket is locked in a level position, but when the bucket is set on the ground, the bail is free to swing in an arc toward the rear of the bucket only through a limited arc to an inclined position where the bail is substantially clear of the top of the bucket, but does not extend substantially beyond the rear end of the bucket. However the arrangement is such that when the bail is lifted at an angle relative to the bucket, the bucket is then free to swing through an arc of 90° for discharging the contents of the bucket. Additionally, buckets so provided are provided with wheels so that they may be close-coupled and run in succession on tracks under a discharge chute, and the bail at the inclined angle does not interfere with this close coupling, nor with the discharge of material into the open tops of the buckets.

Specification

This invention is for a material handling receptacle used industrially, known as an automatic dump bucket.

Dump buckets are widely used in various industries for the handling of various materials such as metal scrap, metal turnings, bulk material, and waste. They are generally manually loaded, picked up by a crane, transported to an unloading station and dumped. The bucket itself is formed of metal and the wall of the bucket at one end, herein called the front end or discharge end, is ordinarily inclined so that when the bucket is tilted, rear end up, material will readily slide out of the receptacle. For handling the bucket there is a bail pivoted to the two sides of the bucket and which arches over the bucket when the bucket is suspended from a crane hook and swings to a generally horizontal position when the bucket is being loaded. The bucket and bail are generally heavy, rugged structures.

An automatic dump bucket is one wherein the bail is locked from pivoting relative to the bucket when the bucket is being carried by a crane so that even though the bucket is unevenly loaded, it cannot tip. However, when the bucket is set down at the unloading station and the crane hook properly manipulated, the lock holding the bail against tilting releases and upon lifting the crane hook, the bucket is tilted forwardly to spill its contents over the sloped front end.

With the various constructions hereinbefore provided there has been a common outstanding danger which has been known to cause death to a worker, and is a continuing injury-causing hazard to workers. This comes about because when the bucket is returned to a position to be loaded and the crane is unhooked, the bail may be in the vertical position unlocked and in unstable equilibrium, so that it may swung unexpectedly or be bumped, swinging down to a horizontal position, striking with force anyone standing in its way or injuring someone who may happen to be reaching over the bucket.

Another disadvantage is that sometimes it is desirable to have the buckets mounted on wheels and closely coupled together to move in succession past a chute or the like through which material is discharged into a bucket. One example may be in a steel plant soaking pit installation where rubble is cleaned out from the pit through openings in the furnace bottom. By lowering buckets into a trench or on a track that is below the bottom of the pit, one at a time, and coupling each added bucket to the previous one, and moving them in succession past the discharge chute in the bottom of the pit, while lifting away the filled buckets one at a time at the opposite end of the trench or track, rubble, spent refractory or the like can quickly be removed in preparing the furnace for repair or relining. However, the bail arrangement as presently provided interferes with this operation, since the bail of one bucket when lowered toward the horizontal position extends over the open top or loading area of a succeeding bucket.

The present invention provides, in an automatic bucket, a limiting means that does not interfere with the usual manipulation of the bucket, but which prevents the bail from ever moving when it is standing free beyond a limited angle such that it does not constitute a hazard to a bystander or workman or interfere with loading the buckets or coupling them in close succession. This feature may also be desirably provided in dump buckets designed with a chute-like extension at the front end for furnace charging.

In buckets of the type referred to, the bails, in addition to being pivoted to the receptacle, are movable vertically to a limited extent relative to the bucket. When the bucket is at rest the bail lowers relatively to the bucket. When the crane hook lifts the bucket, it first pulls up on the bail and elements on the bail engage abutments on the bucket to prevent relative pivoting motion. When the bucket is set down, slacking the line to the crane hook, the bail moves back down relative to the bucket. To unload the bucket the crane operator then trams the crane hook backward away from the bucket, while the bucket is at rest and the bail is then pulled angularly upward relative to the bucket. With this operation said elements on the bail clear the abutments on the bucket so that the locking of the bucket and bail is not then affected. Actually an element on the bail so engages an abutment on the bucket as to impart a positive tilting motion to the bucket to tilt the bucket forward and empty the contents from the bucket. With the present invention the elements on the bail engages another abutment on the bucket only when the bail moves down to its lowermost position relative to the bucket and thereby prevents the bail from swinging down to a horizontal position. However, when the crane hook is trammed back as above described and lifting on the bail takes place, this element and abutment first clear one another and the bucket is free to tilt to a dumping angle, which, except for furnace charging and similar open ended buckets as hereinafter described, is from a horizontal position through an arc of 90° to a full vertical position.

These and other objects and advantages are secured by this invention which may be more fully understood by reference to the accompanying drawings, in which.

Figure 1:
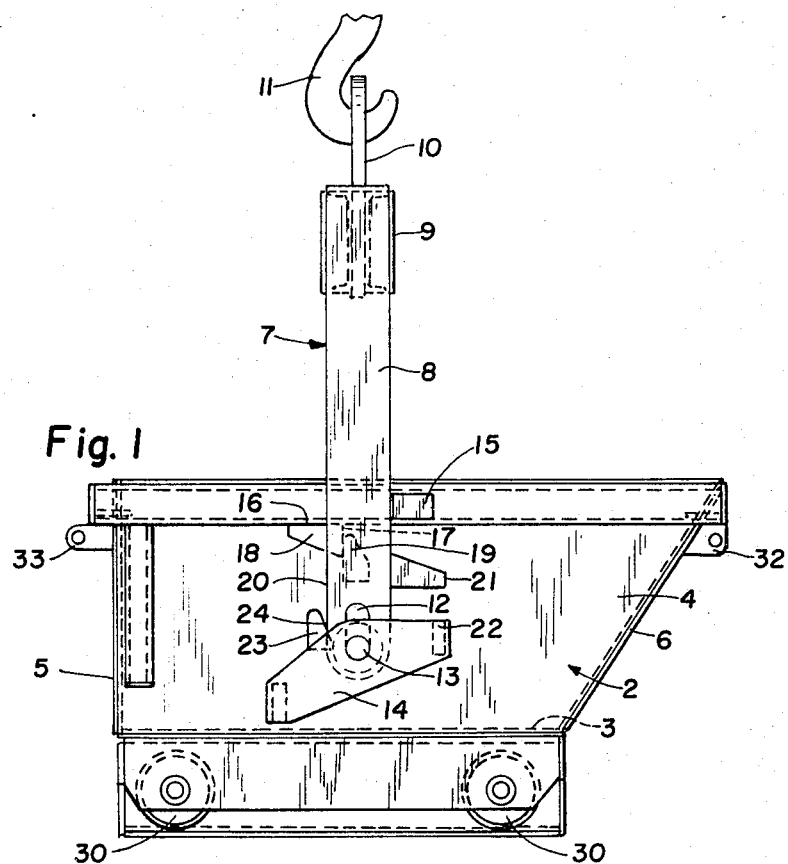
FIG. 1 is a side elevation of the automatic bucket with the parts in position when the bucket is suspended from a crane hook.

Referring to FIGS. 1 to 4 of the drawings, 2 designates generally a metal bucket of the type to which the present invention relates. It has a bottom 3, parallel side walls 4, a vertical end wall 5 at one end, herein referred to as the rear end, and an upwardly and forwardly inclined front wall 6.

The bail is designated generally as 7, and it sets astraddle of the bucket with a leg 8 extending down each side of the bucket intermediate the front and rear ends. The bail has a cross piece 9 connecting the two legs, and this cross piece carries an eye 10 to which a crane hook 11 shown in FIG. 1 may be detachably engaged.

Near the lower ends of each leg is an elongated slot 12. There is a pivot pin 13 attached to the side of the bucket and to bracket 14 also attached to the side of the bucket with the slotted end of the leg extending into the space between the side of the bucket and the bracket.

On the side edge of the bucket in a position to engage the bail when it is in a vertical position as shown in FIG. 1, there is an abutment 15 that prevents the bail from swinging forwardly past a vertical position.

Secured to the side of the bucket in a position to clear the bail is an abutment element 16 that has a vertical face 17 and an inclined under face 18. On the inner face of the bail there is a cooperating abutment element 19 that has a vertical face 20, and which is of decreasing width upwardly, having a rounded upper end. Projecting from the forward edge of the leg of the bail is a lateral projection or wing 21.

When the bucket is suspended from a crane hook as shown in FIG. 1, the pivot pin is at the bottom of the elongated slot 12. The vertical face 20 of the abutment 19 on the leg of the bail is in contact with the vertical surface 17 of the abutment 16 and the forward edge of the leg is against the abutment 15 so that relative tilting of the bucket and bail is prevented and the parts are locked in the position where the bail is vertical with respect to the top edge of the bucket which is at that time horizontal.

Figure 2:
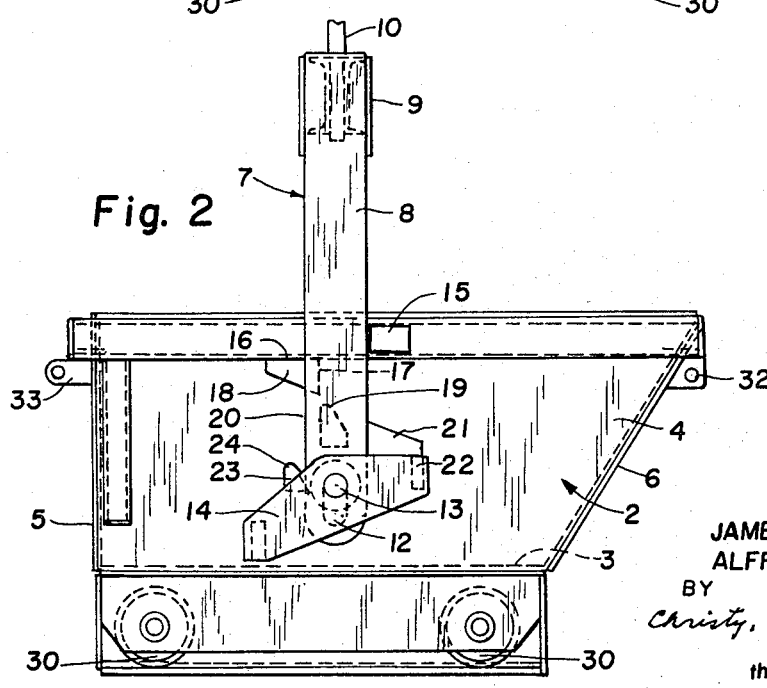
FIG. 2 is a similar view with the bail lowered to the position it assumes when the bucket is set down.

When the bucket is set down so that the legs of the bail are not under tension, the bail drops down relative to the bucket to the position shown in FIG. 2 where the pivot pin 13 is then at the top of the slot 12 and the abutment or wing 21 is against a stop 22 at the forward edge of the bracket 14. The abutment 20 on the leg of the bail is clear of the abutment 16 so that the bail is then free to swing to the left as viewed in FIG. 2.

So much of the construction as has heretofore been described is known in the art. According to the present invention there is provided an abutment or rest lock 23 affixed on the side of the bucket, this lug or rest lock having an angularly-inclined end face 24 confronting the leg of the bail. This rest lock is in a position where the abutment 19 on the leg will be in confronting relation to it when the leg of the bail drops down as above described. If the bail then swings to the left as it is free to do, the abutment 12 will contact the inclined face 24 of the rest lock 23, limiting the relative arcuate movement of the bail with respect to the bucket to an angle where the top of the bail will just about clear the top of the bucket, but not project substantially to the rear of the bucket. This is an angle of roughly about 30° from a vertical position. Consequently the bail, when it is released by the crane hook, cannot fall down to a horizontal position and strike anyone who may be in the vicinity of the end of the bucket. As above described, this swinging of the bail to a horizontal position has heretofore presented a hazard to workmen and has been the cause of at least one fatality known to the applicants.

In the use of an automatic bucket of this kind with the bail in the inclined position, the crane hook may again be attached to the eye 10, the hook being trammed back by the operator to a position for the hook 11 to be engaged by the bail and to lift the bail in an angular direction relative to the bucket. As the bail moves up in an angular direction relative to the bucket, the abutment 19 clears the abutment or rest 23, and with continued movement in this direction the rounded top end of the abutment 19 strikes the under side 18 of the abutment 16 to start the forward tilting movement of the bucket to empty its contents. With this maneuver the lifting action can continue until the bucket has swung through an arc of 90° relative to the bail to completely discharge its contents. At this time the bucket will then hang from the bail with its bottom in a vertical plane.

It will be seen that by this arrangement the bail cannot swing through an arc of 90° when the bucket is at rest on the ground or floor or other support, but the bucket can tilt relative to the bail through a full angle of 90°, or sufficient to discharge its contents when the bucket is lifted in an angular direction to a point where the abutment 19 clears the rest lock or abutment 23.

After the bucket has been unloaded the crane hook is maneuvered to first set the bucket down and then lifted vertically relative to the bucket and in so doing the parts go back to the position shown in FIG. 1 where there can be no tilting of the bucket relative to the bail, at all. The present invention therefore resides in the provision of means such as the abutment 23 so located with reference to an abutment such as 19 on the leg of the bail as to permit the bail to clear the open top of the bucket but prevent it from swinging to a horizontal position when thte bucket is at rest, but which does not interfere with the tilting of the bucket through a full arc of about 90° relative to the bail when the bucket is to be emptied.

Figure 3:
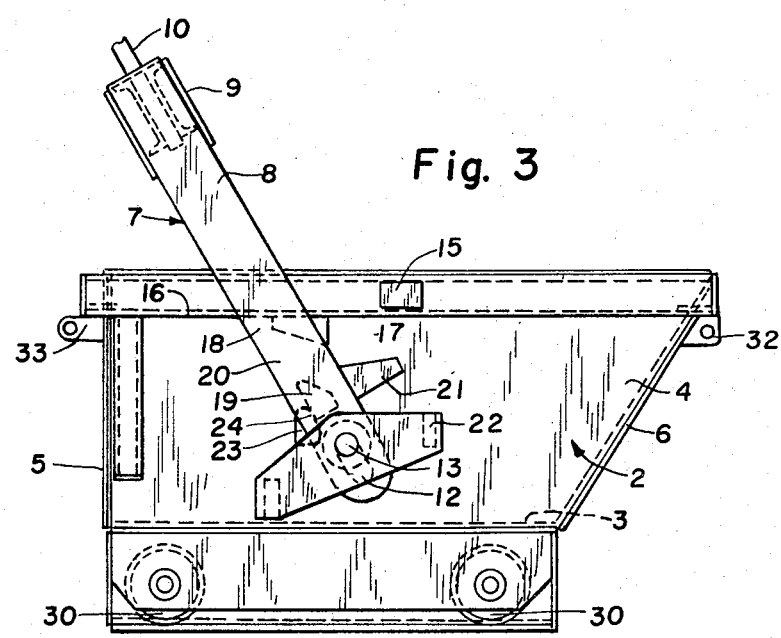
FIG. 3 shows the bucket in the "at rest" position with the bail inclined to the rear as far as it may go.
Figure 4:
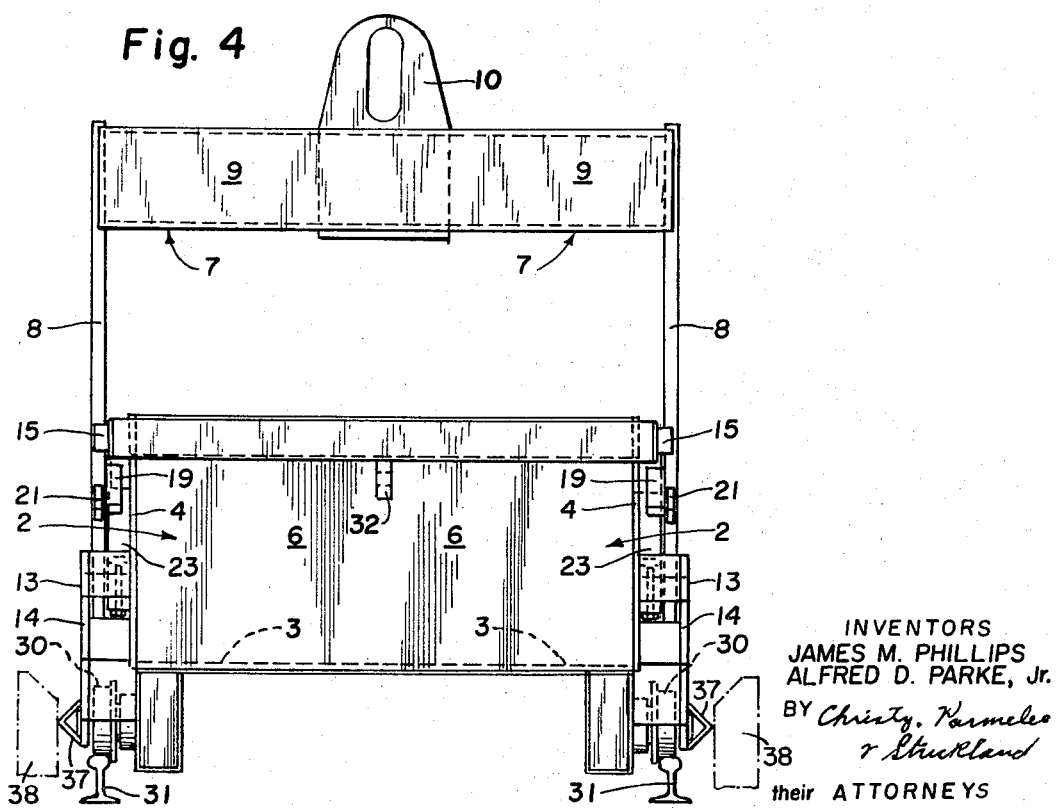
FIG. 4 is a front elevation showing a half of the bucket, the other half in the plane.

Because of the fact that the bail can move to the position shown in FIG. 2, but never drop down to a horizontal position, the invention makes possible the application of these buckets to an arrangement where the buckets can be coupled together to move in succession past a discharge chute without the bail of one bucket resting over the loading area of a succeeding bucket whereby it cannot interfere with the loading of material into the top of the succeeding bucket. When the bucket is to be so used, wheels are provided on the under side of the bucket, but they are not required except where the bucket is to be moved along the surface on which it rests. In FIGS. 1, 2 and 3 we have shown a bucket provided with wheels 30 at the front and rear on each side of the bucket. These wheels may be rubber-tired or they may be flanged as shown so as to ride on rails 31. There is a coupling eye 32 at the forward end of each bucket and another coupling eye 33 projecting from the rear of the bucket.

Figure 5:
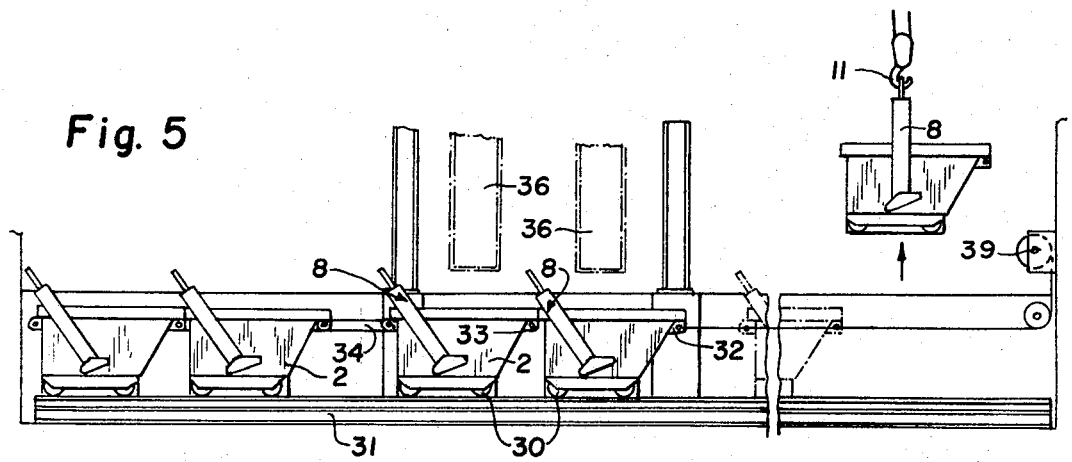
FIG. 5 is a schematic side elevation showing cars coupled together in an installation where they are lowered by crane onto one end of track, coupled to preceding bucket while a bucket at the other end is lifted away.

As schematically shown in FIG. 5, two or more buckets may be closely coupled together with a coupling pin passing through the registering eyes at the rear of the forward bucket and the front of the succeeding bucket, and sometimes there may be a coupling bar between buckets as indicated at 34 in FIG. 5. With this arrangement the buckets may be set by a crane on a trackway, moved in succession past material discharge chutes 36, as for example rubble discharge chutes leading from the bottom of a soaking pit as above described. The buckets, after being filled with rubble, travel toward the other end of the track 31 where they can be picked up by the crane in the manner described and transported to an area to be dumped. To facilitate the positioning of the buckets on the track when they are being lowered, there may be an angular shaped section 37 secured to the sides of the bucket between the wheels which may strike a curb or similar locating element 38. The inclined surface on the curb 38 engaging the angular element 37 serves to guide the wheels of the bucket onto the track. A car pulling winch 39 is shown at the bucket removal end of the installation, and in FIG. 5, the two front buckets are shown uncoupled ready for lifting them from the track.

It will be understood that where buckets are used individually and are moved entirely by a lifting crane, wheels need not be provided, in which case skids as usual may replace the wheels.

Figure 6:
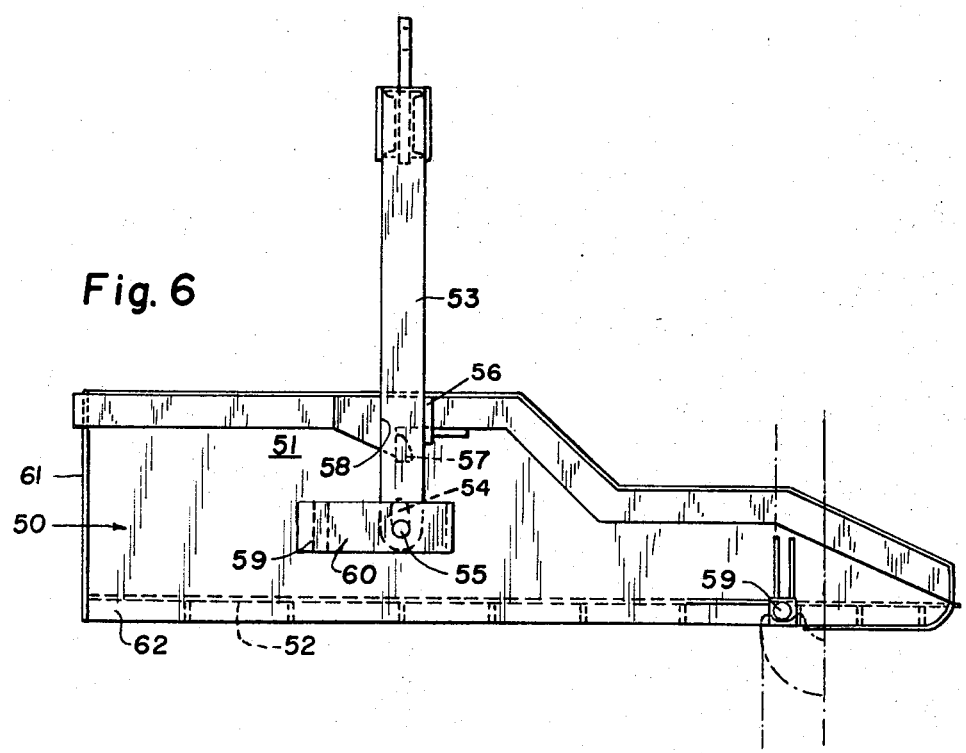
FIG. 6 is a side elevation of one type of bucket with an open discharge end and designed especially for charging material into a furnace, the drawing showing the nose of the bucket resting on the usual supporting bar outside the charging opening.

In the construction shown in FIG. 6, the bucket 50 is relatively longer and shallower than the bucket shown in FIG. 1 and the side walls 51 are of forwardly-decreasing height while there is no end wall at the front. The bottom 52 is flat for the full length of the bucket, so that the bucket is of a chute-like shape. The bail legs 53 extend down the outside of the bucket and have an elongated slot 54 through which a pivot pin 55 on the side of the bucket passes, the arrangement being generally similar to the arrangement shown in FIGS. 1 and 2.

This bucket is intended for use in charging material into a furnace. It never needs to swing from a horizontal to a vertical position in dumping, but is merely tilted far enough from a level position to overcome the angle of repose of the material and let it slide forward into a furnace opening.

In use, the crane brings the loaded bucket, locked against tilting by the bail leg contacting forward abutment 56 and abutment 57 on the leg, corresponding to abutment 19 in FIGS. 1 and 2, being engaged with stop 58 corresponding to abutment 16 in FIGS. 1 and 2, and the forward end of the bucket is projected into the furnace opening with the under side of the bucket, a short distance to the rear of the forward end being rested on the usual cross bar 59 at the front of the furnace. The bucket is then lowered until the rear end rests on the floor or on a stand positioned to support it. As the load is relieved on the crane, the bail drops down to disengage the abutment 57 from the stop 58. This causes the bail to swing toward the rear of the bucket until the bail then strikes a stop 59 at the rear of bracket 60. This prevents the bail from swinging further, but in this position it clears the top of the bucket when the bucket is at some other station to be loaded. It cannot swing down to a position substantially beyond the top of the rear wall of the bucket. A rear wall 61 of the bucket serves to retain the load in the bucket when the bucket is tilted rearward in the manner indicated.

With the bucket in position at the furnace as above described, the crane hook is tracked to the rear to pull the bail up relative to the bucket at an angle so that abutment 57 clears the stop 58 and the bucket as it is raised tilts forwardly until it reaches an angle where the charge in the bucket slides out the forward end into the furnace.

It will be seen that in this construction the bucket is never tilted to a position where the bottom is vertical and therefore it is unnecessary, as it is in FIGS. 1 and 2, to so arrange the elements on the bail and the bucket as they are in FIGS. 1 and 2 that they clear one another as the bail moves angularly upward. In the construction shown in FIG. 7 there are skids 62 on the bottom of the bucket instead of wheels, but wheels could be provided if desired.

In both embodiments of the invention as herein described, there is a stop arrangement for limiting the arc of movement of the bail relative to the bucket where the bail in the rest position does not interfere with loading the bucket but may not swing down to a position where it is entirely below the top of the rear wall of the bucket in combination with an arrangement where relative pivoting of the bail and the bucket is prevented when the bucket is being carried by a crane, with the cooperating parts on the bail and bucket being such that the means for limiting the arc of movement of the bail permitting the bucket to be swung to the unloading position. In the case of a bucket with a front wall which must be tilted through a full arc of 90° from a horizontal to a vertical position to dump, the abutment 19 on the leg of the bail is shifted out of the arc of travel of the abutment.

We claim:

1. In a dump bucket of the class described wherein the bucket has a bottom, side walls, a rear wall and a front portion over which material is discharged when the bucket is tilted rear-end up to discharge contents therefrom, and which has a bail having legs attached to the sides of the bucket intermediate its ends to permit relative arcuate and limited sliding movement of the bail and bucket with cooperating stop means on the bail and bucket which are engaged when the bail is lifted relative to the bucket in a direction vertical to the longitudinal axis of the bucket to interlock the bail and bucket against relative pivoting movement but which are disengaged when the bucket is at rest and the bail moves downwardly relative to the bucket to permit the bail to swing toward the rear of the bucket, and wherein the said cooperating means are not engaged to interlock when the bail is raised relatively to the bucket at a rearwardly-sloping angle from a direction vertical to the longitudinal axis of the bucket so that the bucket may tilt rear-end up when the bail is so lifted:

the invention herein described wherein there is an abutment on the bail leg and there is a stop means on the side of the bucket for engaging the abutment on the bail leg for limiting the rearward arcuate movement of the bail relative to the bucket when the bucket is in an at rest position and the bail is lowered relative to the bucket to its full limit and so positioned that the bail may then move only in a limited arc from a vertical position to an inclined one where the top of the bail is above the level of the top of the bucket but the top of the bucket is unobstructed by the bail, said stop means on the bucket being positioned as to be clear of the abutment on the bail when the bail is moved upwardly at an angle from the inclined position and the bucket may then be tilted relative to the bail through a full arc of 90° to the dumping angle.

2. The invention defined in claim 1 wherein the said abutment element on the leg is also one of the said cooperating stop means on the bucket and bail that interlock and hold the bail and bucket against relative pivoting movement when the bail is raised vertically relative to the axis of the bucket.

3. The invention defined in claim 1 wherein the bucket has wheels thereon and coupling means at each end of the bucket for coupling it in a succession of buckets and the arcuate movement of the bail of one bucket is limited to a range to clear the top of its bucket and be clear of the top of the succeeding bucket without the bails obstructing the open tops of the buckets, whereby the buckets may be loaded in succession.

4. The invention defined in claim 1 wherein the bucket has wheels thereon and coupling means at each end of the bucket for coupling it in a succession of buckets and the arcuate movement of the bail of one bucket is limited to a range to clear the top of its bucket and be clear of the top of the succeeding bucket without the bails obstructing the open tops of the buckets, whereby the buckets may be loaded in succession, the sides of the buckets having sloped angle plates thereon at the level of the wheels for cooperation with a curb element adjacent a track on which the bucket is to be placed for aiding a crane operator in lowering the bucket to a rest position on the track.

5. The invention defined in claim 1 wherein the forward end of the bucket has an upwardly and forwardly-sloping end wall and the bucket moves through an arc of 90° from a horizontal position relative to the bail when it is being dumped but wherein said stop means limits the arc of movement where the top of the bail is above the level of the top of the bucket but does not obstruct the charging of material into the bucket of the bail relatively to the bucket when the bucket is at rest to an angle.

6. The invention defined in claim 1 wherein the forward end of the bucket is a chute-like extension of forwardly-diminishing depth and the bottom of the bucket is substantially flat.

7. Automatic dump bucket apparatus comprising a track, a material discharge chute positioned to discharge material over the track, a plurality of automatic dump buckets detachably coupled together movable along the track to receive material from the discharge chute, each bucket having a bail attached thereto by means of which the bail may be lowered by a crane onto one end of the track and lifted off at the other, said bail and bucket being connected in a manner to prevent relative tilting movement of the bail and bucket when the bucket is suspended from the crane with a load to be transported but wherein the bail may be moved arcuately toward the rear of the bucket when the bucket is at rest and wherein the bucket may turn 90° with respect to the bail when the bucket is being dumped, the bucket and bail having cooperating means thereon to prevent the bail on one bucket extending over the top of a succeeding bucket to which it is coupled when the bail is moved rearwardly from a vertical position and the bucket is at rest on the track.

References Cited
UNITED STATES PATENTS

| | | | |
|---|---|---|---|
| 1,343,465 | 6/1920 | Moore. | |
| 1,449,661 | 3/1923 | Forsythe | 294—73 |
| 2,798,758 | 7/1957 | Yakopec | 294—73 |
| 3,230,003 | 1/1966 | McAfoos et al. | 294—73 |

ROBERT G. SHERIDAN, *Primary Examiner.*